350-3.73 SR

OR 3,628,847

SEARCH ROOM

United Stat

[11] 3,628,847

[72] Inventor David Ira Bostwick
Mercer, N.J.

[21] Appl. No. 855,676
[22] Filed Sept. 5, 1969
[45] Patented Dec. 21, 1971
[73] Assignee RCA Corporation

[54] HOLOGRAM MEMORY
4 Claims, 4 Drawing Figs.

[52] U.S. Cl. 350/3.5
[51] Int. Cl. G02b 27/22
[50] Field of Search 350/3.5

[56] References Cited

UNITED STATES PATENTS 3,529,887 9/1970 Lu 350/3.5

OTHER REFERENCES van Heerden, Applied Optics, Vol. 2, No. 4, pp. 393- 400 (4/1963).

Vitols, IBM Tech. Disclosure Bulletin, Vol. 8, No. 11, pp. 1581- 1583 (4/1966).

*Primary Examiner*—David Schonberg
*Assistant Examiner*—Robert L. Sherman
*Attorney*—H. Christofferson

ABSTRACT: An array of holograms, each representing many light sources, is employed during the write operation. When one of these holograms is illuminated by a laser beam, the reconstructed light sources of that hologram illuminate a corresponding number of memory locations of a "page" of data. The light from the page then is focused onto a small area of a recording medium. A reference beam from the same laser concurrently is directed at this same small area to cause to be "written" there a hologram of the page.

INVENTOR
DAVID I. BOSTWICK
BY [signature]
Attorney

INVENTOR.
DAVID I. BOSTWICK
BY Samuel Cohen
Attorney

HOLOGRAM MEMORY

BACKGROUND OF THE INVENTION

One solution to the problem of storing huge amounts of binary data is a hologram memory system. The recording medium may be photographic film for a read-only memory or photochromic material or certain types of magnetic, or other materials for an erasable memory. In such a memory, either permanent or erasable, a hologram is stored at each memory location and each memory location need occupy only a very small area perhaps a hundredth to a thousandth of an inch or less. Each hologram may store a large amount of data—perhaps $10^3$ to $10^5$ bits or more.

The present invention deals with the problem how to "-write" information, in an efficient manner, into such a memory.

SUMMARY OF THE INVENTION

The system of the invention includes an array of holograms, each representing a plurality of coherent light sources equal in number to the memory locations on a page and each such source located in the same relative position as a memory location on a page. When the object beam illuminates a selected one of the holograms, the reconstructed image of its light sources illuminates a page and the light from the illuminated page is focused onto a small area of the recording medium. A reference beam is also directed to this small area to create an interference pattern which is recorded as a hologram.

DETAILED DESCRIPTION

Figure 1:
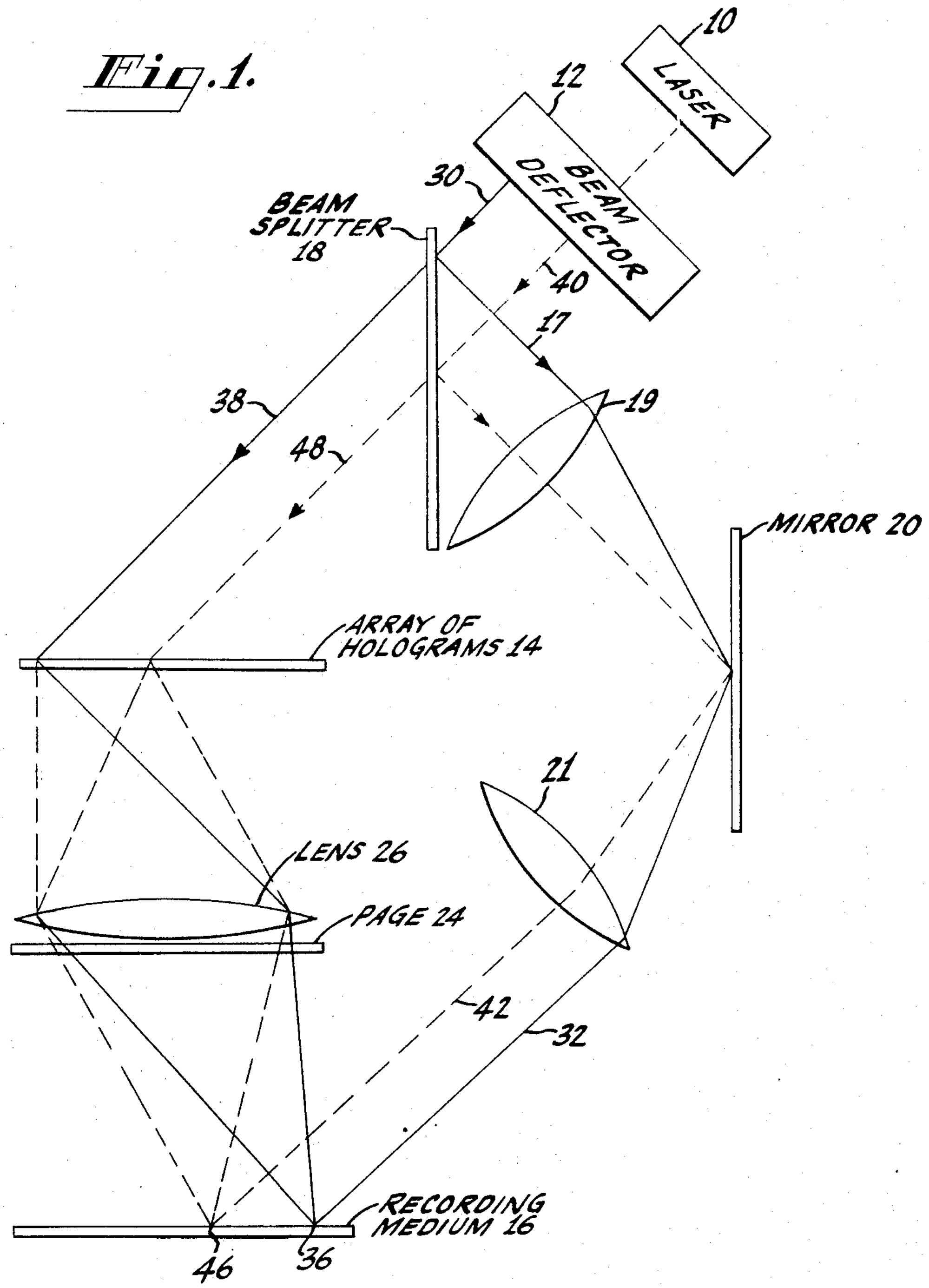
FIG. 1 is a schematic showing of the system of the invention.

The system of FIG. 1 includes a source of coherent light such as laser 10 and a light beam deflector 12. The latter may be electromechanical or electronic in nature and its purpose is to deflect the laser beam to any one of $N^2$ positions, where $N^2$ represents the number of holograms in the array 14 and represents also the number of storage locations on the recording medium 16.

The deflected light beam produced by deflector 12 is applied to a beam splitter 18. One portion 17 of the light is reflected from the beam splitter and mirror 20 onto one location on the recording medium 16. The lenses 19 and 21 are employed to make the beam 17 undergo the same number of refractions and reflections as the other portion 38 of the light beam. The other portion 38 of the light beam passes through the beam splitter 18 and onto the array of holograms 14.

Figures 2, 3, 4:
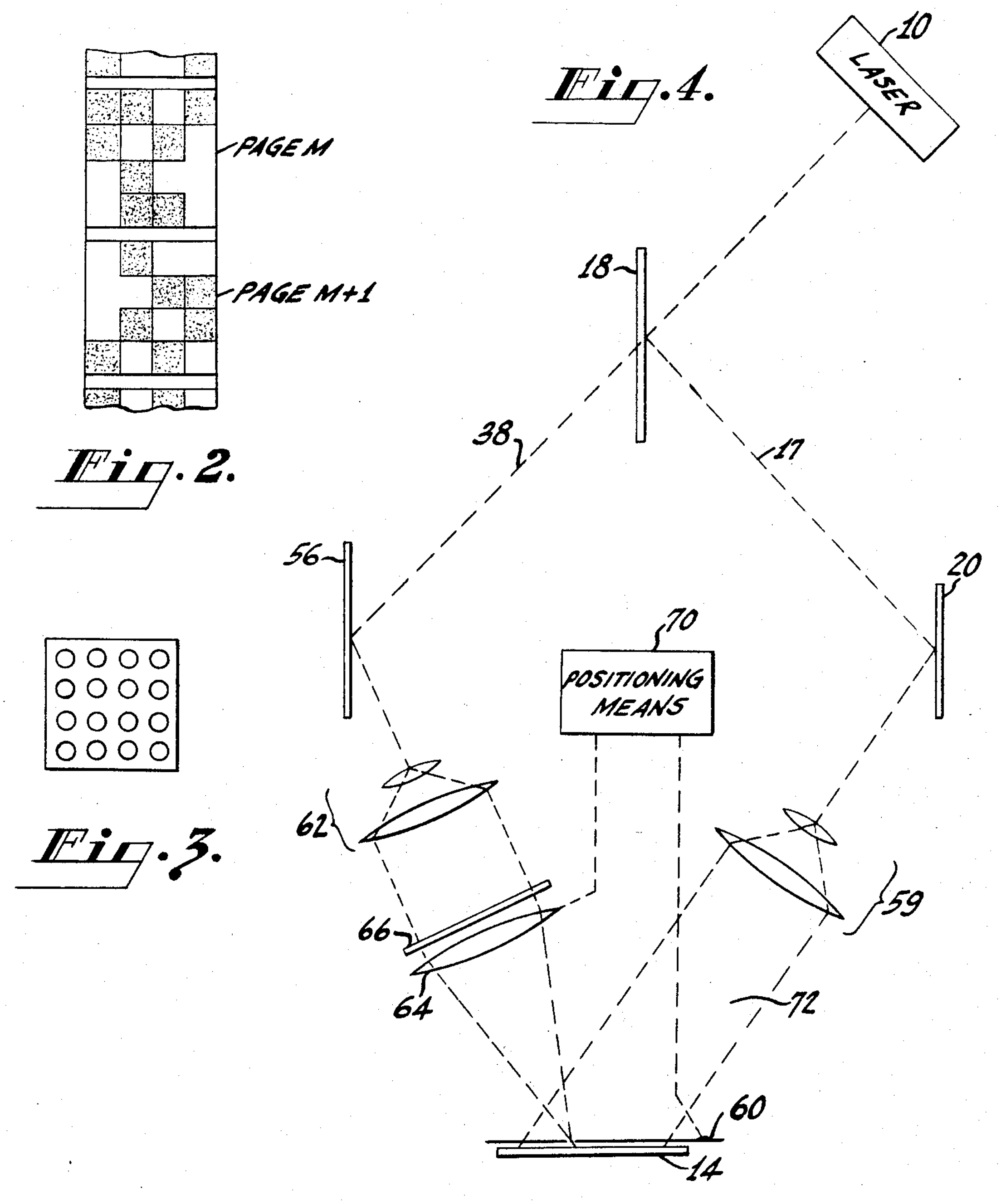
FIG. 2 shows a number of pages of information.
FIG. 3 is a reconstructed image of a plurality of light sources stored as one of the holograms in the array shown in FIG. 1.
FIG. 4 is a schematic showing of a system for forming the array of holograms, each of which represents a plurality of light sources shown in FIG. 1.

Each hologram in the array 14 represents a plurality of light sources equal in number to the number of bits stored in the page 24. For purposes of the present discussion, each hologram in the array 14 is illustrated in FIG. 3 to represent 16 light sources and each page 24 is also illustrated to contain 16 bits. In practice, of course, $B^2$—the number of bits per page —is much larger than 16.

The spacing between the array of holograms 14 and the page 24 (twice the focal length of lens 26) is such that the reconstructed image of the hologram illuminated falls onto the page 24. Referring a moment to FIG. 3, the reconstructed light sources may appear as 16 sources of coherent light arranged in an array, as shown. The page 24 may be one frame of a photographic film such as shown in FIG. 2. For example, the page may be page M. Alternatively, the page 24 may be an electronically or electrically controlled light shutter means the storage locations of which may be made transparent or opaque in accordance with the binary data it is desired to write into the memory. Each light source superimposes over an opaque or a transparent area of the page.

THe lens 26 causes the light passing through the page 24 to focus onto a very small area on the recording medium in a position dependent upon the amount and direction the light beam is deflected by the beam deflector 12. Put another way, the position on the recording medium onto which the light is focused by lens 26 is a function of the particular hologram selected from the array 14. The optics of the system is such that the beam from mirror 20 is also directed at the same location on the recording medium. THe result is the creation at the recording medium of an interference pattern which is recorded there as a hologram.

The recording medium 16 may be a photographic film for a permanent, that is, a read-only memory. Alternatively, the recording medium may be a photochromic, magnetic or other form of erasable material.

In the operation of the system of FIG. 1, a page, such as page M of FIG. 2, initially may be located in the position of page 24. At this time, the beam deflector may deflect the laser beam to the position indicated by solid line 30. The reference beam 32 which results falls on one location, 36, of the memory recording medium 16. THe object beam 38 passes through the beam splitter 18 and one hologram in the array of holograms 14. This causes to be reconstructed at the page location the image of an array of coherent light sources such as shown in FIG. 3, each light source illuminating one bit of information (one opaque or transparent square) on the page. The lens 26 causes this light to converge onto the same location 36 as the reference beam 32. The result is the formation of a hologram in a very small area, perhaps one thousandth of an inch, on the recording medium.

When it is desired to record a second page of information, such as page M+1, the latter is placed in the position of page 24. In the apparatus illustrated, this merely involves moving the film to the next frame. The beam deflector is now adjusted to deflect the laser beam to another location on the array of holograms 14 and another location on the recording medium 16. For example, the laser beam may be deflected as indicated by dashed line 40. The reference beam 42 now strikes the recording medium at location 46. The object beam 48 now passes through another hologram in the array 14. This other hologram contains the same information as the remaining holograms in the array 14, that is, each hologram is identical and represents the same array of 16 light sources. The optics is such that regardless of the location of the hologram selected from array 14, its image appears at the same place —at the position of the page 24. However, the lens 26 directs this light to a new location, namely location 46 on the recording medium. THerefore, at location 46 a second hologram is recorded, this one of the page M+1.

During the write operation described above, the recording medium, in the case of a photographic film, initially is unexposed. The write operation for each location may require, in the case of a photographic film, of the order of seconds or less of exposure time and in the case of certain magnetic materials such as manganese bismuth, of the order of microseconds or less. In the case of photographic film, after all memory locations have been written, the film is processed—developed and fixed.

There are a number of very important advantages achieved with the writing method described above. One is that no mask is required in front of the recording medium and therefore no moving parts are needed to move the mask to different positions. In many previous systems, such a mask—an opaque member with a small hole in it—is required to prevent exposing the portions of the recording medium other than the one on which it was desired to write.

A second important advantage is that the system is highly efficient. All of the energy in the object beam illuminates a particular hologram in the array 14 and almost all is used in the recording process.

The above advantage becomes even clearer when considering the prior art exemplified by FIG. 11 of "The Promise of Dense Data Storage," Electronic Design, 11, May 24, 1969, page 62. There, the object beam passes through a so-called "illumination hologram." The illumination hologram is an array of identical holograms, each hologram simulating a reflector and simple light-diverging lens. The light passing through one of these holograms illuminates a "subject mask" and "shutter matrix." The shutter matrix corresponds to a page of information of the present application. However, the subject mask is an element not employed in the present system. The subject mask is in fact an array of small holes in an opaque medium. It permits the light passing through the open shutters of the matrix to reach the recording medium. However, as the holes occupy only a very small percentage of the area of the subject mask, the arrangement is extremely inefficient in that it permits only a small percentage of the object beam to reach the memory recording medium, even with all shutters open.

In a practical memory system the speed with which holograms can be made is limited by the intensity of light in the object beam. In the present arrangement the array of holograms can deflect as much as 80–90 percent of the object beam 38, energy onto the page 24. Since the hologram images light onto only those areas of the page which comprise a possible bit location, all of this deflected light is available as the object beam for the final memory 16. Thus, the available object beam energy is efficiently utilized and for a given laser power 10, the time for making a memory hologram is minimized. The present arrangement is believed to be about one hundred times more efficient in its use of light than the known arrangement described in the reference above.

FIG. 4 illustrates one way in which the array of holograms 14 may be formed. The laser may be the same laser 10 as employed in FIG. 1. It directs a beam of coherent light through beam splitter 18 to mirror 56. This same beam is reflected from beam splitter 18 to mirror 20. Note that the beam splitter and mirror may be the same ones as are employed in FIG. 1 and note also that the object beam 38 and reference beam 17 are at the same angles relative to the beam splitter, as the corresponding beams in FIG. 1. The other optical elements are also similarly arranged in the two figures.

The beam reflected from mirror 20 is broadened by lenses 59 and passes through the mask 60 (an opaque element formed with a single small opening therein) and onto the recording medium 14. The latter may be an unexposed film.

The beam reflected from mirror 56 is broadened by lens 62 and the broadened beam is applied through an opaque screen 66 formed with an array of small holes therein, and is focused onto the recording medium by lens 64. In one practical design, the holes were 2 mils in diameter spaced 16 mils on center, although higher packing density than this possible. In this arrangement also, the region of element 66 formed with holes was a quarter of an inch by a quarter of an inch in area and included 256 holes. The lens 64 focuses the light onto a small area of the recording medium 14.

In the operation of the system of FIG. 4, the positioning means 70 positions the lens 64 to focus the light of the object beam from the array of holes 66 and onto one location of the recording medium 14. The positioning means 70 also positions the mask 60 so that the small hole in the mast aligns with the beam focused by the lens 64. The mask 60 is very close to the recording medium 14 and it permits only that portion of the broadened reference beam 72 which passes through the hole in the mask to reach the recording medium 14. Thus, there is formed an interference pattern on the recording medium at one particular location on the recording medium and this interference pattern is recorded as a hologram. The exposure time may be made sufficiently long—say of the order of 10 seconds—to insure that a high quality hologram, representing reasonably intense light sources, is stored.

The same technique above may be employed to form the other holograms on the recording medium 14. After sufficient exposure of the film, the opening in the mask 60 is closed by a shutter (not shown) and the lens 64 and mask 60 are moved by the positioning means 70 to a new location. Thereafter, the shutter is opened to permit light again to pass through the opening in the mask and a new area of the recording medium is exposed. This process is continued until the required number of holograms is formed in the recording medium the latter thereafter is developed and fixed.

As mentioned previously, for purposes of the present application, each page of information is illustrated to contain 16 bits and each hologram in the array 14 is stated to represent 16 light sources. In practice, the number of bits and light sources may be of the order of $10^3$ to $10^5$, and the number of holograms stored in the recording medium 16 may be $10^3$ or more per square inch.

While the invention has been illustrated in terms of the formation of a transmission type hologram on the recording medium, that is, by the use of a page which either blocks the passage of light or permits it to pass, depending upon the value of the binary digits stored, other forms of the invention are possible. As one example, the object beam may be reflected from the page onto the recording medium. The claims are intended to be generic to this and other equivalent systems.

What is claimed is:

1. In combination:

a page of data comprising an array of memory locations, each location optically representing the value of the binary digit stored at that location;

an array of holograms, each of a plurality of coherent light sources equal in number to the memory locations on said page and located in a position corresponding to that of a memory location;

a recording medium;

a source of coherent light;

means for deriving from said source a reference beam and directing it at one of a plurality of locations on said recording medium;

means for deriving from said source an object beam and directing said object beam at a hologram of said array for reconstructing the image of the light sources stored there over the corresponding memory locations on said page; and means for focusing the light reaching said page onto the same location on said recording medium as said reference beam.

2. In the combination as set forth in claim 1, said page of data comprising a member formed with light-passing and light-blocking memory locations.

3. In the combination as set forth in claim 1, said page of data comprising a sheet formed with opaque locations to represent storage of bits of one value and transparent locations to represent storage of bits of the other value.

4. In the combination as set forth in claim 1, said page of data comprising a sheet formed with dark and light regions to represent storage of bits of different value.

* * * * *